United States Patent Office 3,490,413
Patented Jan. 20, 1970

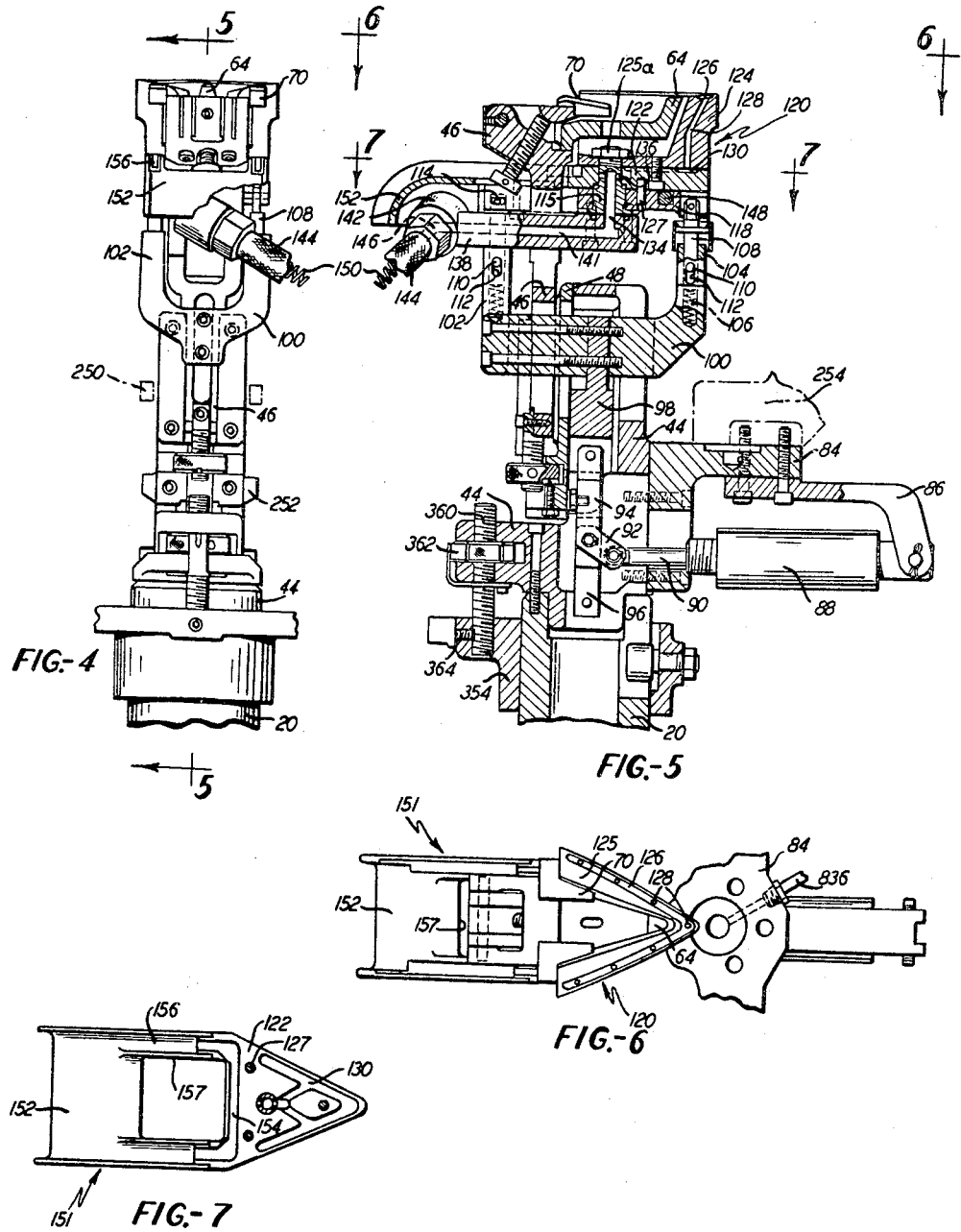

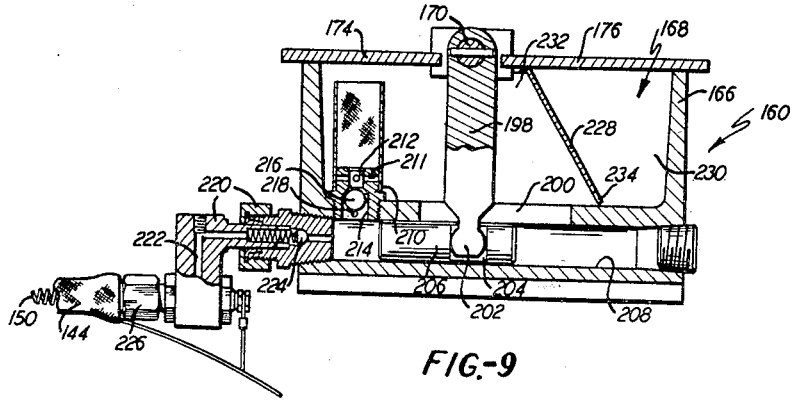
FIG.-9
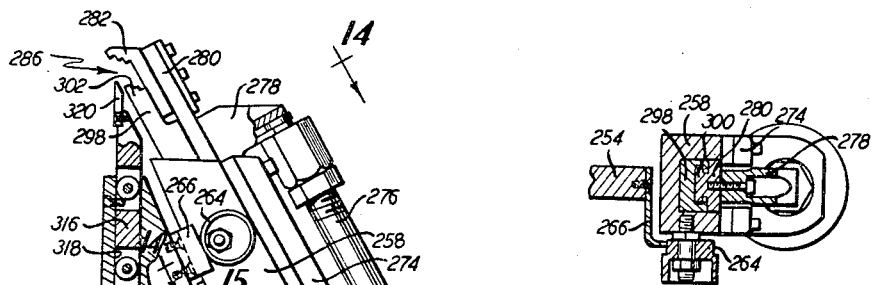
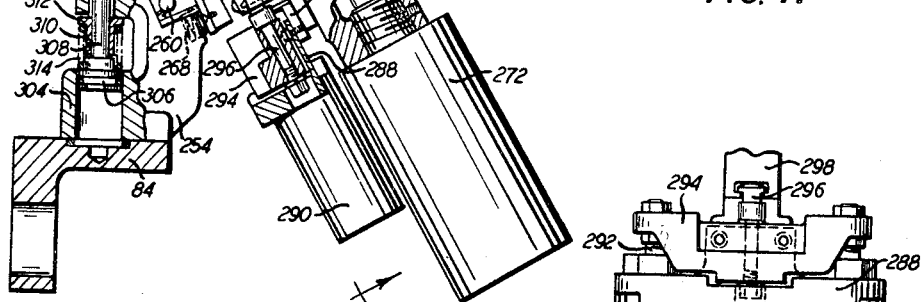
FIG.-14
FIG.-13
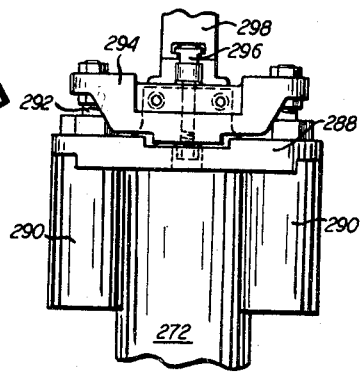
FIG.-15

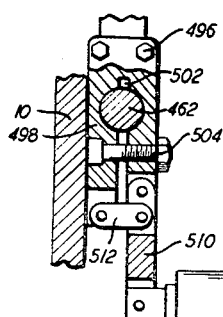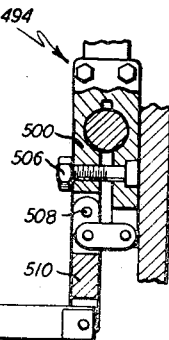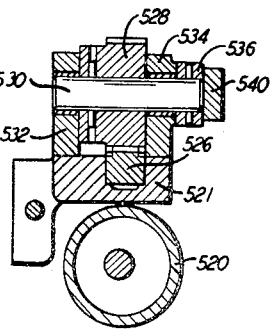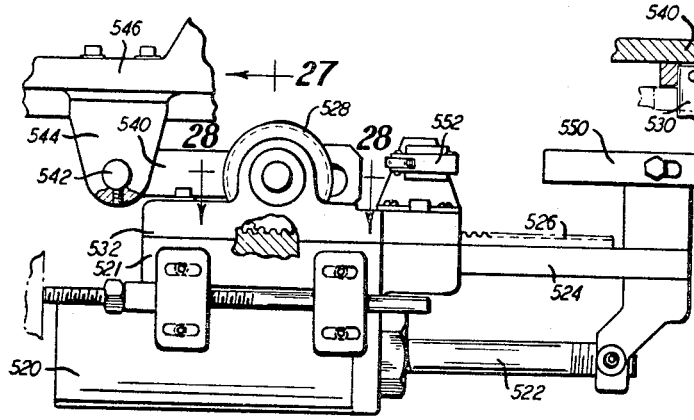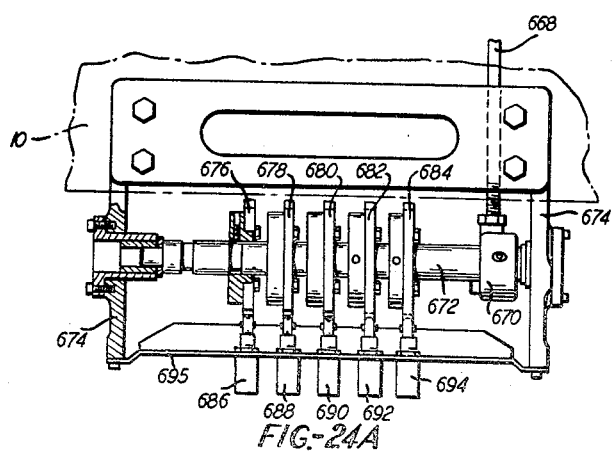

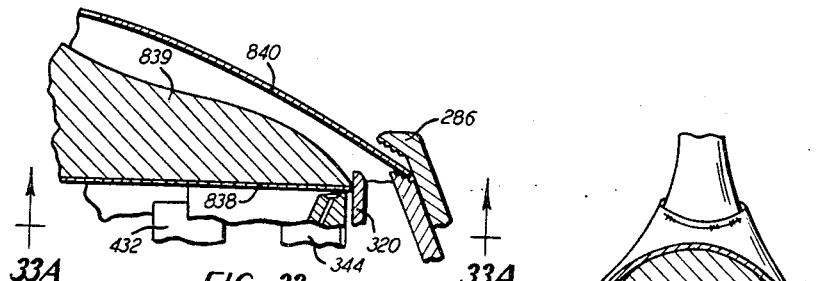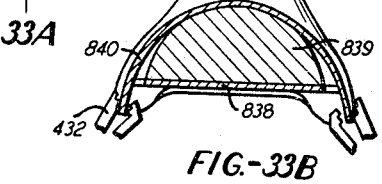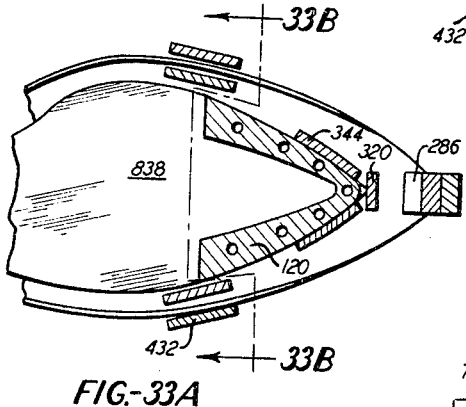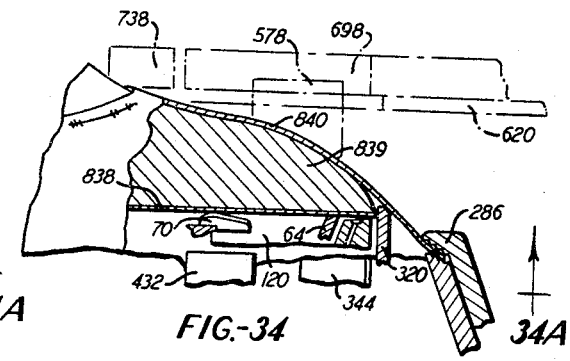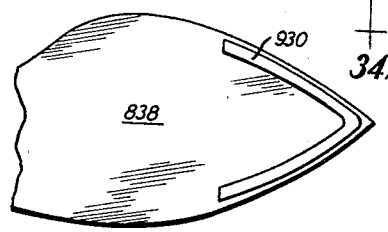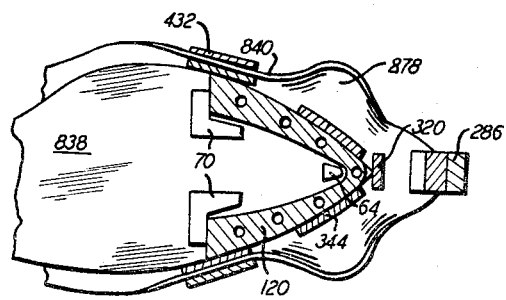

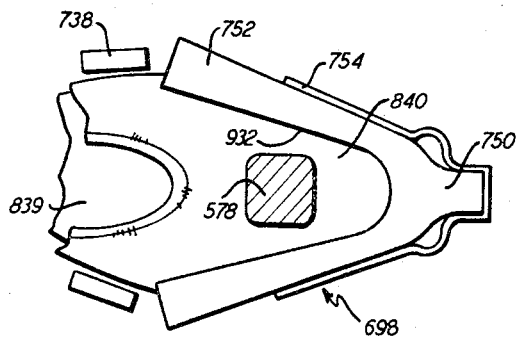
FIG.-36
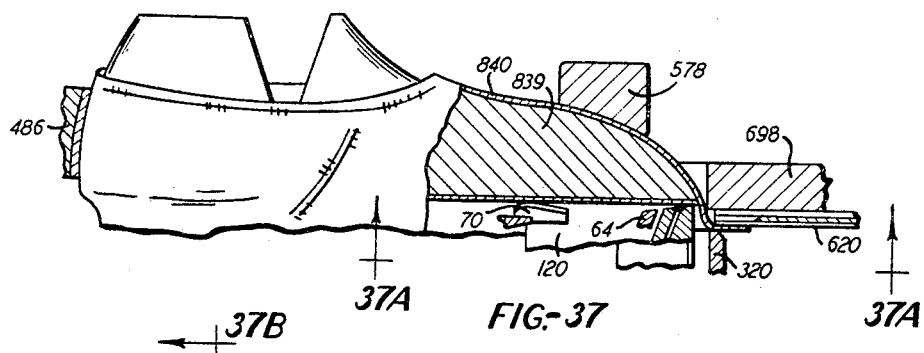
FIG.-37
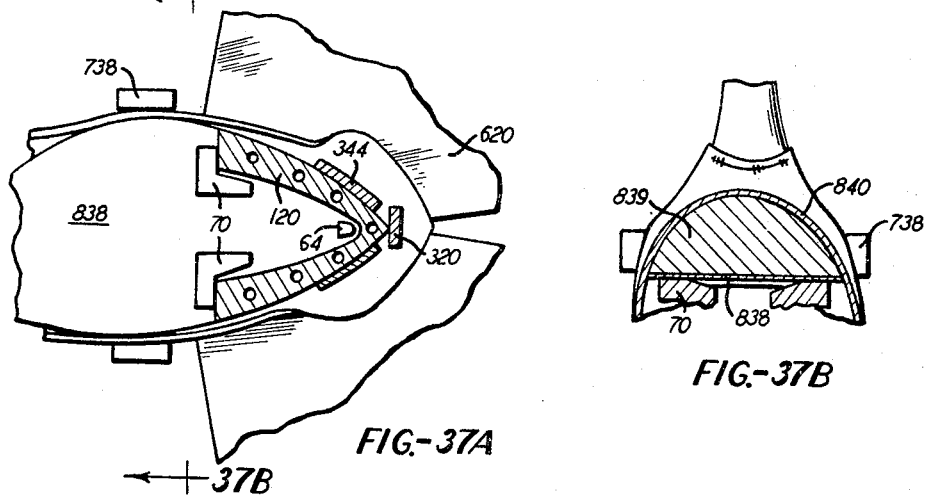
FIG.-37A
FIG.-37B

3,490,413
CEMENT APPLYING MECHANISM
Jacob S. Kamborian, 70 Crestwood Road, West Newton, Mass. 02165, and Walter A. Vornberger, Medford, and James H. Arsenault, Whitinsville, Mass.; said Arsenault and said Vornberger assignors to said Kamborian
Original application July 16, 1965, Ser. No. 472,525, now Patent No. 3,397,417, dated Aug. 20, 1968. Divided and this application May 23, 1967, Ser. No. 640,611
Int. Cl. B05c 1/02, 11/02
U.S. Cl. 118—7
3 Claims

ABSTRACT OF THE DISCLOSURE

Apparatus for stretching the toe and forepart portions of a shoe upper about the corresponding portions of a last, applying cement to an insole secured to the last bottom and wiping the margins of the stretched upper portions against the insole to attach the wiped margin portions to the insole. A fluid actuated pump means for the cement is provided with a handle so that the cement may be pumped by hand while the machine is in the idle condition.

---

This is a division of application Ser. No. 472,525 filed July 16, 1965, now U.S. Patent No. 3,397,417.

This invention relates to a machine that incorporates a cement applying mechanism for extruding cement from a cement extruding mechanism through a conduit and then through an applicator. A power driven plunger is provided in the extruding mechanism that is operative to force the cement from the extruding mechanism through the conduit and a hole in an applicator onto a workpiece herein illustrated as an insole. In order to fill the conduit and the applicator hole with cement prior to the powered actuation of the plunger, the plunger may be reciprocated by a manually manipulable member. The powered means for driving the plunger is a fluid pressure actuated motor incorporated in a machine, and a control is provided that blocks the admission of fluid to the motor when the machine is in its idle condition so that the plunger may be manually reciprocated.

In the accompanying drawings:

FIGURE 4 is a front elevation of a portion of the machine including an arrangement for supporting the shoe assembly;

FIGURE 5 is a section taken on the line 5—5 of FIGURE 4;

FIGURE 6 is a plan view taken on the line 6—6 of FIGURE 5;

FIGURE 7 is a view taken on the line 7—7 of FIGURE 5;

FIGURE 9 is a section taken on the line 9—9 of FIGURE 8;

FIGURE 13 is an elevation, partly in section, of a front pincers and a front retarder;

FIGURE 14 is a view taken on the line 14—14 of FIGURE 13;

FIGURE 15 is a view taken on the line 15—15 of FIGURE 13;

FIGURE 24A is a view taken on the line 24A—24A of FIGURE 24;

FIGURE 25 is a section showing a heel clamp braking mechanism taken on the line 25—25 of FIGURE 24;

FIGURE 26 is a side elevation of a portion of the machine showing an arrangement for moving wipers from an out-of-the-way position to a working position;

FIGURE 27 is a view taken on the line 27—27 of FIGURE 26;

FIGURE 28 is a view taken on the line 28—28 of FIGURE 26;

FIGURE 33 is a representation of the shoe assembly as it appears when it is placed in the machine;

FIGURE 33A is a view taken on the line 33A—33A of FIGURE 33;

FIGURE 33B is a view taken on the line 33B—33B of FIGURE 33A;

FIG. 34 is a representation of the shoe assembly as it appears in the machine after the upper has been stretched about the last by the front and side pincers;

FIGURE 34A is a view taken on the line 34A—34A of FIGURE 34;

FIGURE 35 is a representation of the bottom of the insole with cement applied thereto;

FIGURE 36 is a representation of the shoe assembly, shoe conforming yoke and bumpers during a rise of the shoe assembly through the yoke;

FIGURE 37 is a representation of the shoe assembly as it appears in the machine after the shoe assembly has risen to a level wherein the insole bottom is slightly higher than the level of the tops of the wipers;

FIGURE 37A is a view taken on the line 37A—37A of FIGURE 37; and

FIGURE 37B is a view taken on the line 37B—37B of FIGURE 37A.

Figure 1:
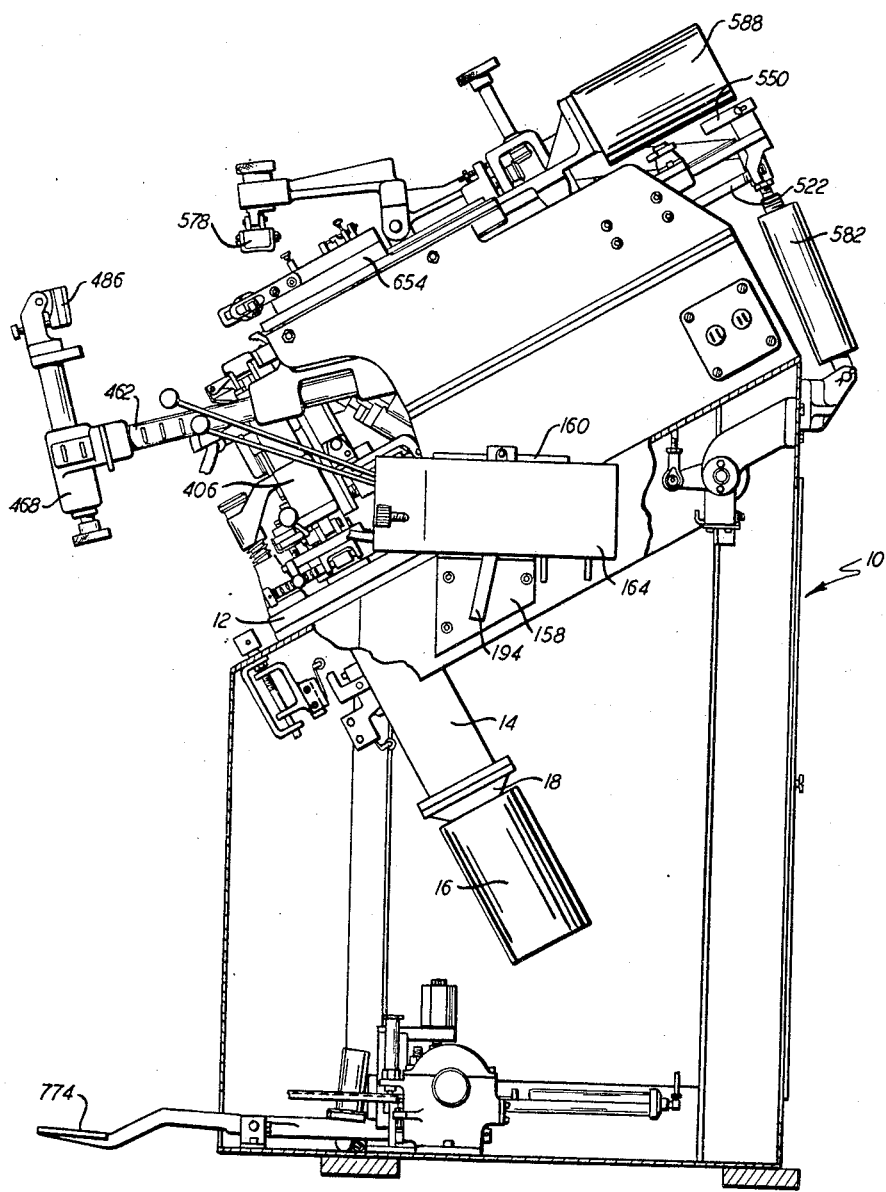
FIGURE 1 is a side elevation of a machine that forms an illustrative embodiment of the invention.
Figure 2:
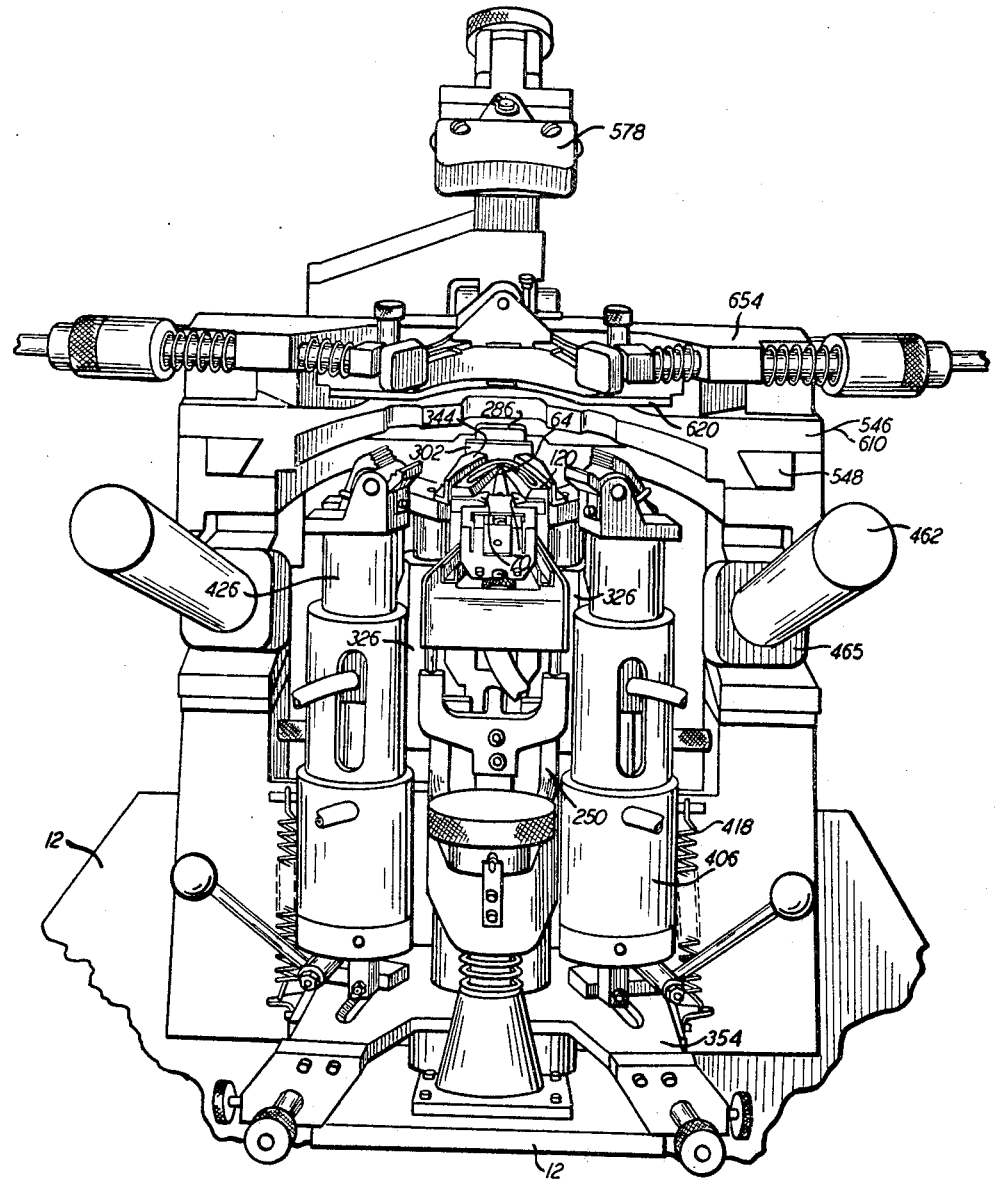
FIGURE 2 is a front elevation of the upper portion of the machine.
Figure 3:
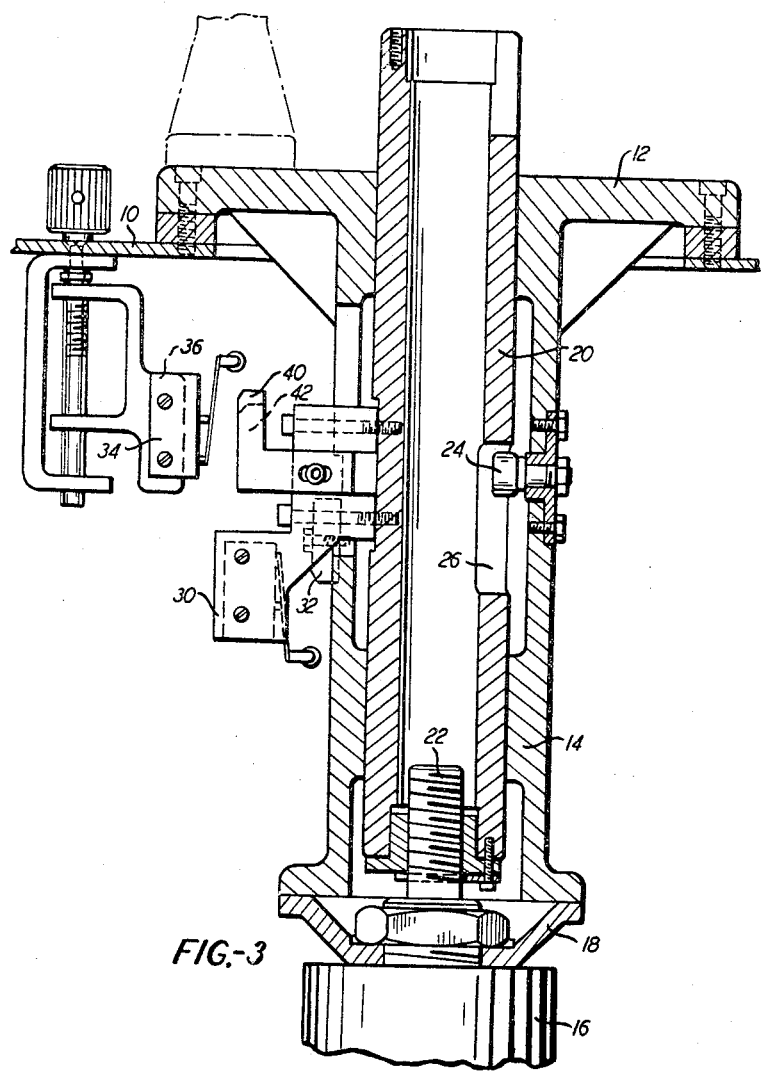
FIGURE 3 is a vertical section of a portion of the machine including a toe post on which a support for a shoe assembly is mounted.
Figure 8:
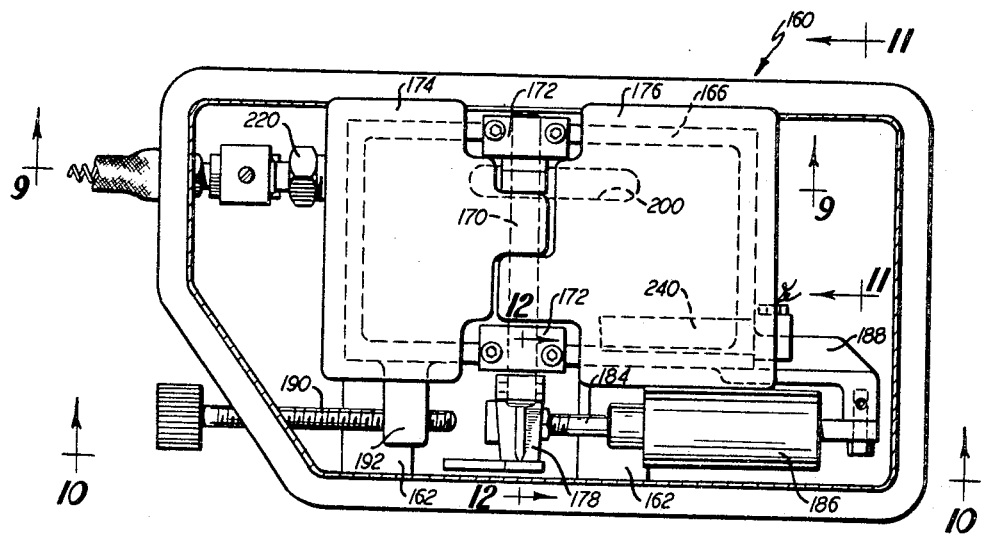
FIGURE 8 is a plan view of the cement extruding mechanism.
Figure 10:
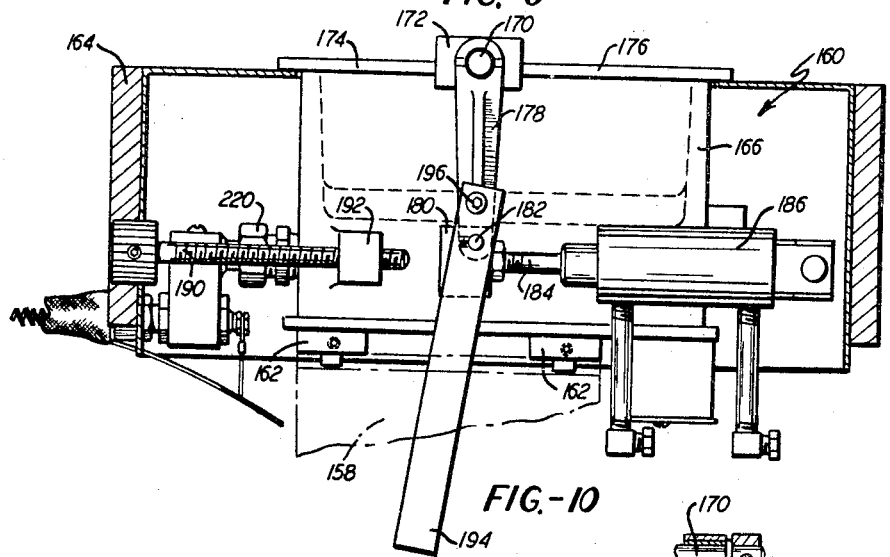
FIGURE 10 is a view taken on the line 10—10 of FIGURE 8.
Figure 11:
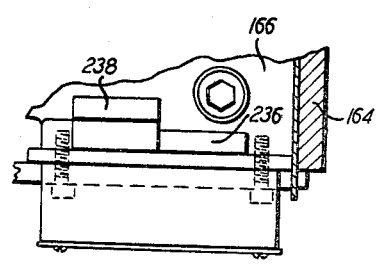
FIGURE 11 is a view taken on the line 11—11 of FIGURE 8.
Figure 12:
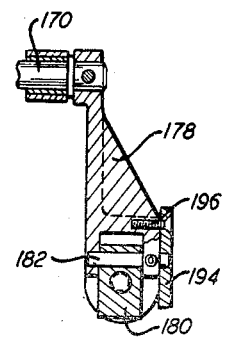
FIGURE 12 is a view taken on the line 12—12 of FIGURE 8.
Figure 16:
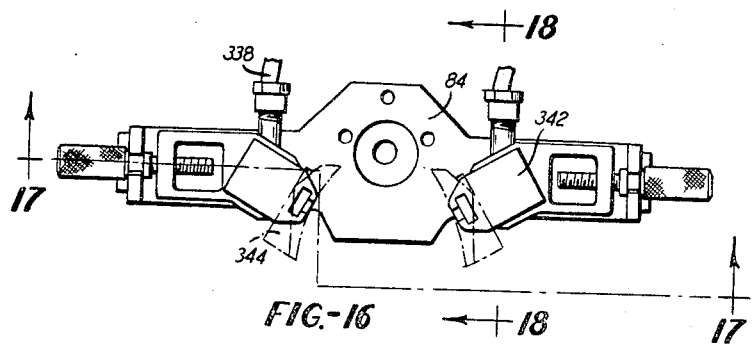
FIGURE 16 is a plan view of side retarders.
Figure 17:
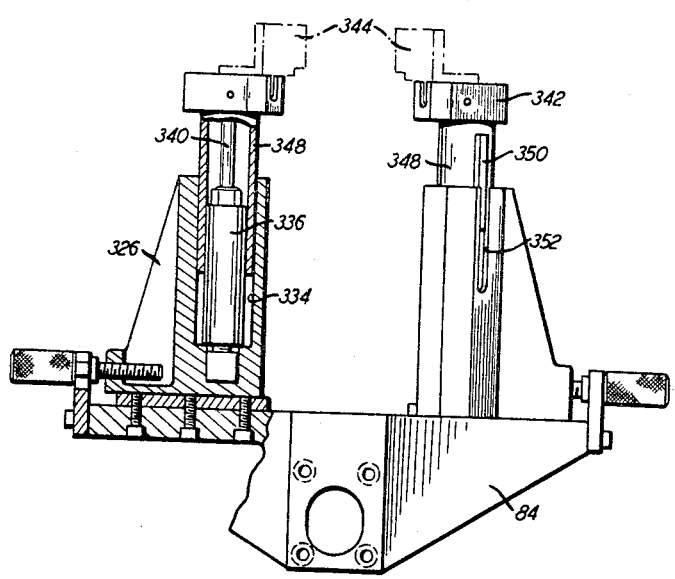
FIGURE 17 is a view taken on the line 17—17 of FIGURE 16.
Figure 18:
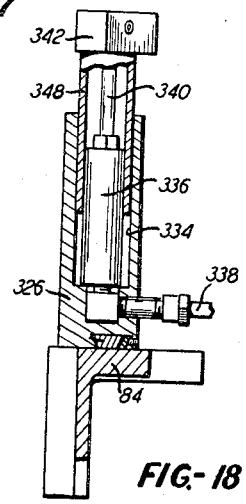
FIGURE 18 is a view taken on the line 18—18 of FIGURE 16.
Figure 19:
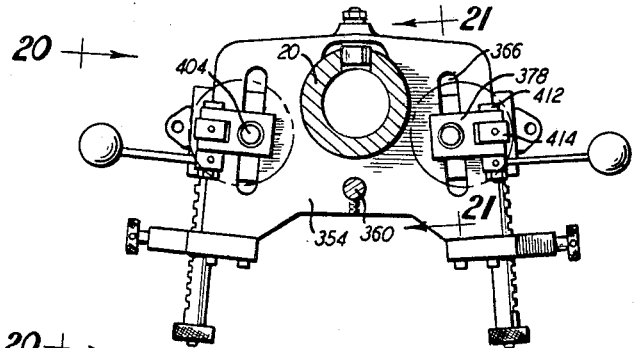
FIGURE 19 is a plan view of a portion of the machine showing the mounting of side pincers.
Figure 20:
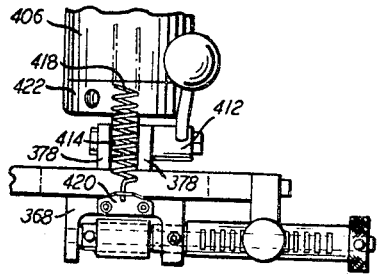
FIGURE 20 is a view taken on the line 20—20 of FIGURE 19.
Figure 21:
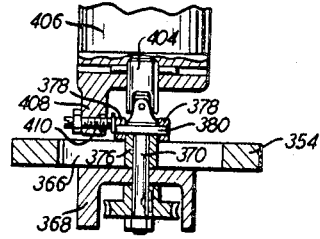
FIGURE 21 is a view taken on the line 21—21 of FIGURE 19.

Referring to FIGURES 1-3, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 is secured to a cap 18 at the bottom of the sleeve 14, and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve.

A toe post extension 44 (FIGURES 4 and 5) is secured to the upper end of the post 20. A bar 46 is secured to the toe post extension 44. A toe insole rest 64 and a pair of forepart insole rests 70 are secured to and extend upwardly of the bar 46.

A rearwardly extending ledge 84 of the post extension 44 has a hanger 86 depending therefrom. An air operated motor 88 is pivoted to the hanger 86. The piston rod 90 of the motor 88 is pivoted to a link 92, and the link 92 is pivoted to a pair of toggle links 94 and 96. The link 96 extends downwardly of the link 92 and is pivoted to the post extension 44 while the link 94 extends upwardly of the link 92 and is pivoted to a slide 98 that is guided for vertical sliding movement by the post extension 44 and a bearing plate 48 that is secured to the post extension 44. A mount 100 is secured to the slide 98 and has a pair of front prongs 102 and a rear prong 104 extending upwardly thereof. Upwardly extending compression springs 106 are seated in each of the prongs 102, 104. Each of the springs 106 bears against a rod 108 to yieldably urge the rods upwardly. Pins 110 in the rods 108 ride in slots 112 in the prongs 102, 104 and normally bear against the tops of the slots to limit the extent of upward movement of the rods 108.

The pins 110 are connected by way of pin and slot connections 114 (FIGURE 5) to a bracket 118. A ferrule 115 extends through and is secured to the bracket 118 and extends through an applicator-support 120 that rests on the bracket 118. The applicator-support 120 comprises a base section 122 that lies below the insole rests 64, 70 and an upwardly extending and forked extruding and support section 124 that has a pair of legs 125 diverging forwardly and downwardly from an apex. The extruding section 124 lies outwardly of the insole rest 64. The section 124, which has a configuration corresponding to the margin of the toe portion of the insole of a shoe to be toe lasted, is secured to the bracket 118 by a fastening member such as a nut 125a threaded onto the ferrule 115 and by aligning pins 127. A groove 126 is provided in the top of the extruding-support section 124 and a plurality of holes 128 intersect the groove 126 and extend downwardly therefrom. The holes 128 intersect channels 130 (FIGURE 7) in the top of the base section 122. The ferrule 115 has holes 134 and 136 therein that are in communication with the channels 130. A strut 138, secured to the undersurface of the bracket 118, has a passage 141 therein that is in communication with the hole 134. An adapter 142 on the forward end of the strut 138 has a hollow, flexible conduit 144 secured thereto. A passage 146 in the adapter 142 provides communication between the passage 141 and the conduit 144. An electric heating element 148 in the bracket 118 is provided to heat the applicator-support 120. The conduit 144 is made of a tube that is thermally and electrically insulative and has an electric resistor wire 150 running therethrough that is connected to a source of electrical energy.

A deflector arrangement 151 (FIGURES 5-7) is secured to the base section 122 and extends forwardly thereof. The deflector arrangement comprises longitudinally extending gutters 156 positioned below the forward ends of the applicator legs 125 below and immediately to the front of the extruding section 124 and a transverse gutter 154 connecting the gutters 156. A deflector plate 152, having a relatively large bearing area, is in communication with the forward ends of the gutters 156. A cut-out 157, bounded by the gutters 154 and 156 and the plate 152, accommodates the insole rest mount plate 46.

Referring to FIGURES 1 and 8-12, a bracket 158 is secured to the frame 10 and supports a source of cement in the form of a cement pot 160, the cement pot being secured to straps 162 that are mounted on the bracket 158. A heat insulative cover 164 is secured to the straps 162 and encompasses the cement pot. The cement pot includes upstanding walls 166 that bound a well 168 (see FIGURE 9). A shaft 170, extending transversely over the well, is rotatably mounted in a pair of hangers 172 that are secured to the walls 166. A pair of cover plates 174 and 176 are pivotally mounted on the shaft 170 to overlie the well 168. A lever 178, secured to the shaft 170 to extend downwardly of the exterior of the cement pot, is pivoted to a block 180 by a pin 182. The block 180 is secured to the piston rod 184 of an air operated motor 186 and the motor 186 is pivoted to a flange 188 that is secured to the cement pot. A stop stud 190, that is threaded into a lug 192 of the cement pot, is in alignment with the block 180. A handle 194, that is mounted on the pin 182 and is secured to the lever 178 by a screw 196, extends downwardly of the block 180. A lever 198 is pinned to the shaft 170 and extends downwardly thereof into the well 168 through a slot 200 in the floor of the well. A prong 202 at the bottom of the lever 198 extends into a clevis 204 formed in a plunger 206 and the plunger is slidably mounted in a bore 208 located in the cement pot below the well 168. A ferrule 210 is threaded in a hole in the floor of the well forwardly of the lever 198. The ferrule has radial passages 211 that intersect a centrally located small diameter passage 212. The passage 212 opens into a large diameter passage 214, the passage 214 intersecting the bore 208. A ball 216, resting on a pin 218 extending across the passage 214, is cooperative with the passage 212 to act as a valve in the manner described below. An adapter 220 is threaded into the cement pot at the forward end of the bore 208. A passage 222 extending through the adapter 220 is normally blocked by a spring pressed ball valve 224. A coupling 226 is secured to the adapter 220 and the end of the conduit 144 remote from the applicator 120 is secured to the coupling 226. A passage through the coupling 226 provides communication between the conduit 144 and the passage 222. A baffle plate 228 (FIGURE 9) extends downwardly into the well 168 from the cover plate 176 to separate the well into two compartments 230 and 232. Cutouts 234 in the bottom of the baffle plate 228 provide communication between the well compartments 230 and 232. Electrical heating elements 236 and 238 (FIGURE 11) are secured to the cement pot 160 and are controlled by a thermostat 240 (FIGURE 8) that extends beneath the well 168.

Referring to FIGURES 13-15, a housing 254 is secured to and extends upwardly of the ledge 84. A bracket 258, located rearwardly of the housing 254, has an extension 262 secured thereto that is pivoted on a pin 260 extending outwardly of the housing 254. A rotary cam or stop element 264 is eccentrically mounted on the bracket 258. A compression spring 268 interposed between the bracket 258 and the housing 254 serves to swing the bracket about the axis of the pin 260 and cause the cam 264 to bear against a stop element 266 that is secured to the housing 254. An air operated motor 272 is secured to a block 274 that is secured to the bracket 258. The motor 272 has a piston rod 276 extending upwardly and forwardly thereof. A block 278 is secured to the piston rod 276, and a bar 280 is rigidly connected to the block 278. The bar 280 is slidably mounted in a guideway in the bracket 258. The upper jaw 282 of a front pincers 286 is secured to the upper end of the bar 280. The lower end of the bar 280 is secured to a bracket 288 on which a pair of air operated motors 290 are mounted. The piston rods 292 of the motors 290 are connected to a hanger 294, and a pin 296 is threaded into the hanger to extend upwardly thereof. The pin 296 is connected to a bar 298 that is slidable in ways 300 formed in the bar 280. The lower jaw 302 of the pincers 286 is mounted on the upper end of the bar 298. Above the ledge 84, the housing 254 is formed into a cylinder 304 in which a piston 306 is vertically movable. A piston rod 308, extending upwardly of the piston 306, is slidable in a bushing 310 that in turn is slidably mounted on the piston rod 308. A shoulder 312 is provided at the upper end of the bushing 310 and bears against the housing 254. A compression spring 314, interposed between the shoulder 312 and the piston 306, yieldably seats the shoulder against the housing bottom and yieldably urges the piston downwardly against the force of the pressurized air that is normally in the cylinder 304. A bar 316, connected to and extending upwardly of the rod 308, is slidable in a vertical guideway 318 formed at the front end of the housing 254 above the cylinder 304, and a front retarder blade 320 is affixed to the top of the bar 316. The pincers 286 and the retarder blade 320 are both positioned rearwardly of the applicator 120 and insole rests 64, 70.

Referring to FIGURES 2 and 16–18, a column 326 is secured to the ledge 84 in each side of the applicator 120 and the insole rests 64, 70. A cavity 334 is provided in each column 326 and an upwardly extending air actuated motor 336 is mounted in each cavity. A line 338 is connected to the bottom of each motor 336 to thereby enable pressurized air to force the piston rods 340 of the motors 336 upwardly. Each of the piston rods 340 is pinned to a block 342 and a side retarder blade 344 is secured in each block 342 to extend upwardly thereof. A sleeve 348 is welded to each block 342. Each sleeve 348 extends downwardly of a block 342 into a cavity 334 between a motor 336 and a column 326. A spline 350, secured to each sleeve 348, extends into a vertical groove 352 provided in each of the columns 326 whereby the blocks 342 and retarder blades 344 are precluded from movement about the vertical axes of the sleeves 348 during their vertical movements in response to actuations of the motors 336.

A base 354 (FIGURE 5) is mounted on the toe post 20 below the toe post extension 44 and above the plate 12. The base 354 is secured to the toe post extension 44 by means of a bolt 360 that is locked to the base 354 by a set screw 364 and is threaded into a nut 362 that is mounted to the toe post extension 44.

Referring to FIGURES 2 and 19–21, the base 354 has a pair of rearwardly convergent slots 366 extending therethrough on opposite sides of the post 20. A block 368 is located below the base straddling each slot 366. A pin 370 extends through each block 368 and slot 366. A sleeve 376, extending through each slot 366, embraces each pin 370 with the bottoms of the sleeves lying on the blocks 368. A stop plate 378 is located above the base 354 to straddle each slot 366 on opposite sides of each pin 370 and sleeve 376. A cross-pin 380 extends through each associated plate 378, sleeve 376 and pin 370 to connect these members. A universal joint 404 is connected, as by welding, to the upper ends of each pin 370 and sleeve 376 and an air actuated motor 406, which acts as a side pincers carrier, is connected to and extends upwardly of the top of each universal joint 404. A lug 408 extending downwardly of each motor 406 has a stop member in the form of a set screw 410 threaded thereon that is adapted to bear against its associated stop plate 378, has an eccentric cam 414 secured thereto. A tension spring 418 extending between each motor 406 and a bracket 420 secured to the base 354 serves to yieldably urge the base 422 of each motor 406 against a cam 414.

Figures 22, 23:
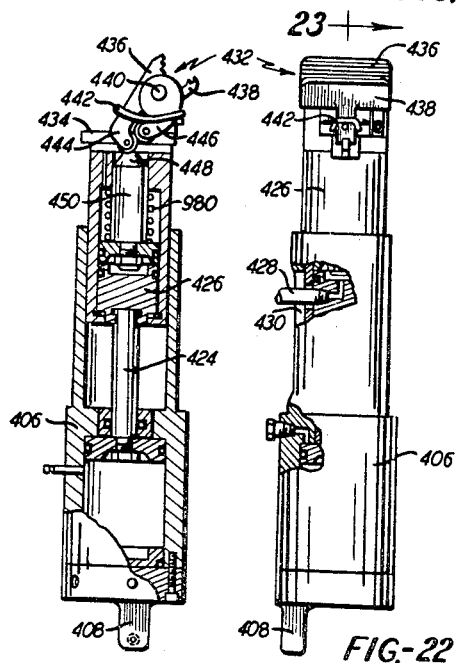
FIGURE 22 is an elevation of a side pincers.
FIGURE 23 is a view taken on the line 23—23 of FIGURE 22.

Referring to FIGURES 22 and 23, the piston rod 424 of each motor 406 has a spring return air actuated motor 426 connected thereto that is slidably mounted in the motor 406. The inlet pipe 428 of each motor 426 rides in a slot 430 formed in the motors 406 to preclude rotation of the motors 426 with respect to the motors 406. A side pincers 432 is mounted on a bracket 434 that is affixed to the top of each motor 426. Each pincers 432 comprises an upper jaw 436 and a lower jaw 438 that are swingable about a pin 440 mounted in the bracket 434. Elastic bands 442 extending about the jaws 436 and 438 serve to yieldably urge the jaws to open position. The jaws 436 and 438 respectively have downwardly extending legs 444 and 446 having rollers thereon that are positioned above a cone-shaped cam 448 formed at the top of the piston rod 450 of each motor 426.

The frame 10 includes a head 452 (FIGURE 24) located rearwardly of the aforementioned parts. An air actuated motor 454 is secured to a hanger 456 depending from the head 452. The piston rod 458 of the motor 454 is connected by way of a plate 460 to a pair of bars 462 (FIGURE 2) that are slidably guided in bosses 464 and 465 affixed to the frame 10. A heel clamp 486 (FIGURE 1) is mounted to a yoke 468 that is secured to and straddles the fronts of the bars 462.

Figure 24:
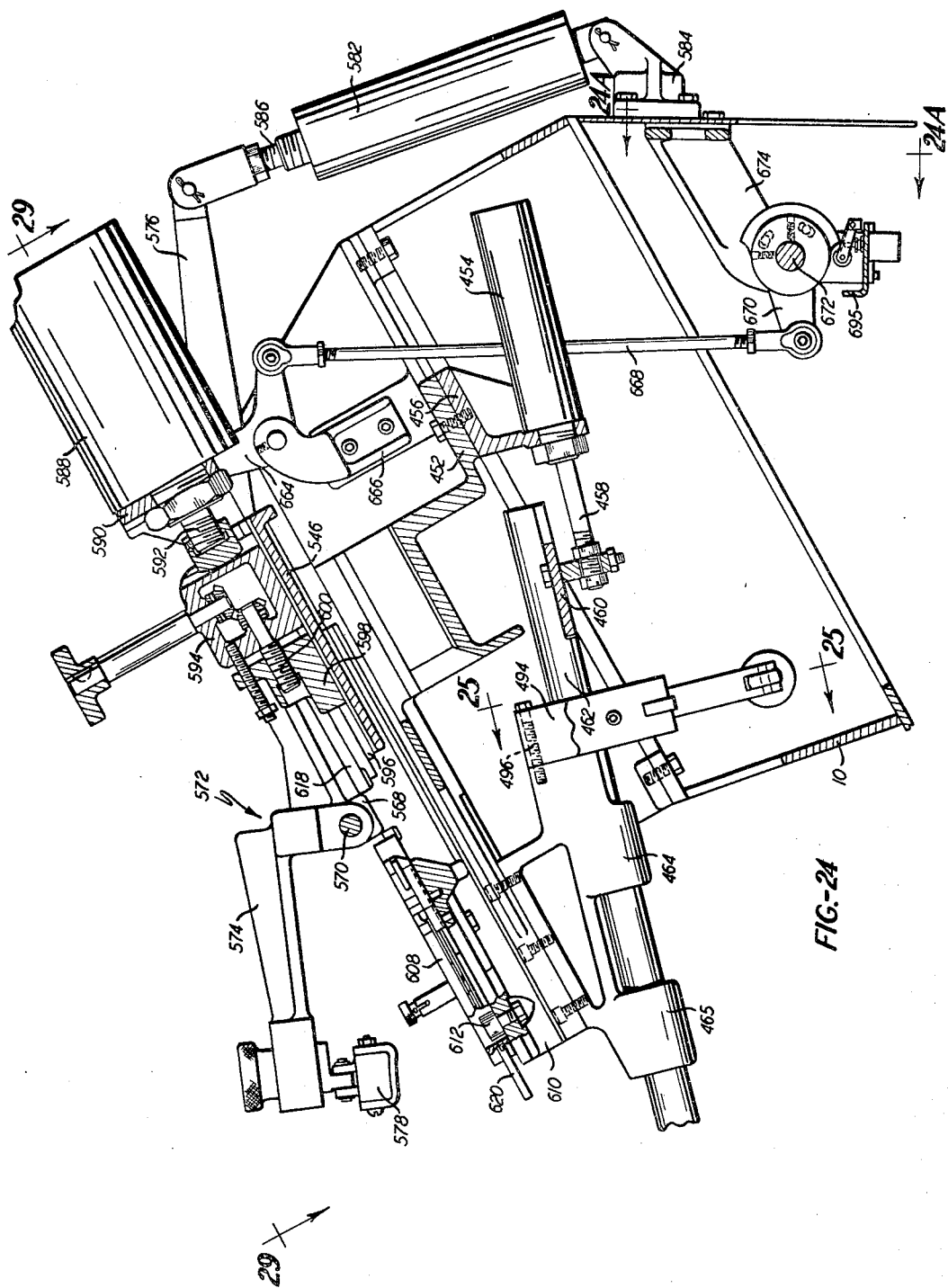
FIGURE 24 is a side elevation of a portion of the machine showing hold-down and wiper operating mechanisms and also showing a heel clamp operating mechanism.

Referring to FIGURES 24 and 25, the bars 462 extend through brakes 494 that are bolted to the bosses 464 by fasteners 496. Each brake 494 is formed of an outer leg 498 bearing against the frame 10 and an inner leg 500 with the legs embracing the bars 462. The legs 498 and 500 are separated by a kerf 502 above the bars 462 which provides sufficient flexibility as to enable the legs 500 to be moved toward and away from the legs 498. A bolt 504, seated in each leg 498 and extending through its associated leg 500, has a nut 506 threaded thereon to limit the extent of inward movement of the legs 500 away from the legs 498. The lower ends of the legs 500 are pivotally connected by pins 508 to limbs 510. A link 512 is pivoted at one end to each limb 510 below the pins 508 and is pivoted at its other end to each leg 498. The lowermost end of one of the limbs 510 is pivotally connected to the cylinder 514 of an air actuated motor 516 and the lowermost end of the other limb 510 is pivotally connected to the piston rod 518 of the motor 516.

Referring to FIGURES 26–28, an air actuated motor 520, that is secured to a block 521, has a piston rod 522 extending rearwardly thereof. The block 521 is secured to the frame 10. The piston rod 522 is secured to a bar 524 that is slidably mounted in the block 521 above the piston rod. A rack 526 mounted on the bar 524 is in mesh with a pinion 528 that is pinned to a shaft 530 and the shaft is rotatable in a pair of trunnions 532 and 534 affixed to the block 521. A crank 536, pinned to the shaft 530, is pivotally connected by a pin 538 to a pitman 540, and the pitman 540 is pivotally connected by a pin 542 to a lug 544 that depends from a slide plate 546. The slide plate 546 is slidably mounted for forward and readward movement in the head 452 on gibs 548 (FIGURE 2). A cam 550 mounted on the bar 524 is in alignment with a normally closed valve 552 mounted on the block 521.

Figure 29:
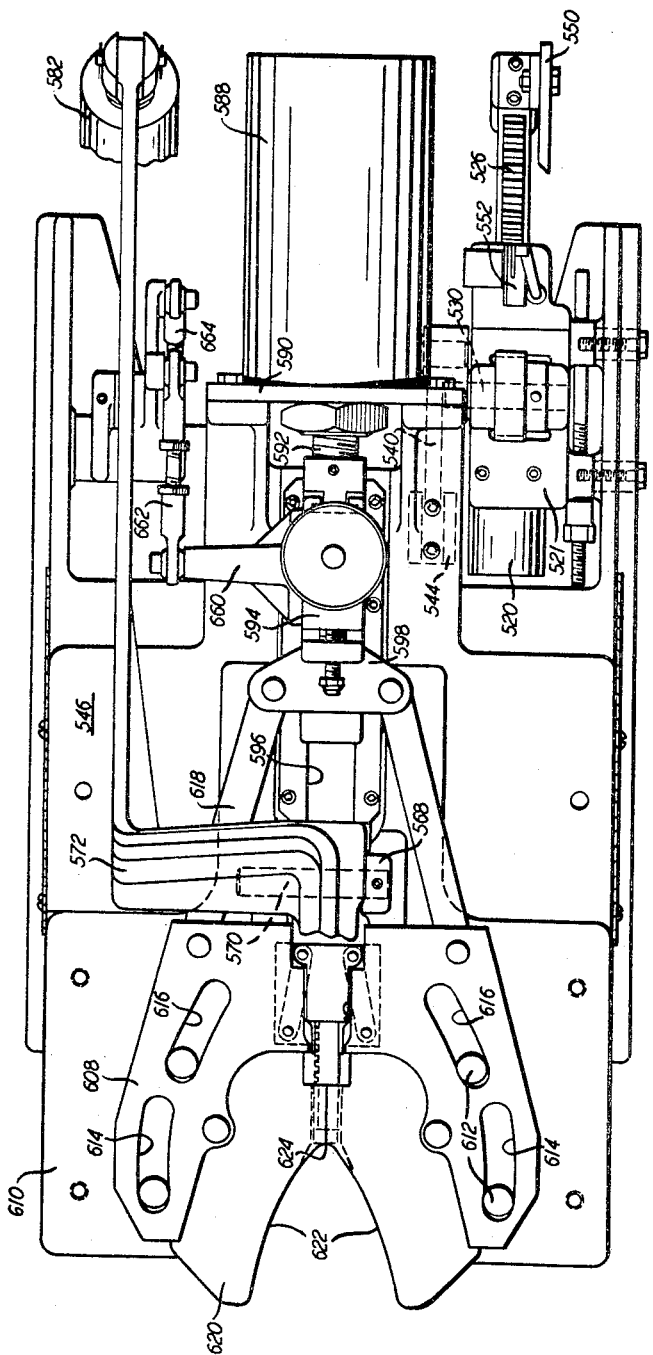
FIGURE 29 is a plan view taken on the line 29—29 of FIGURE 24.

Referring to FIGURES 24 and 29, trunnions 568 upstanding from the slide plate 546 mount a pin 570 on which is swingably mounted a hold-down lever 572. The lever 572 has a front leg 574 extending forwardly of the pin 570 and a rear leg 576 extending rearwardly of the pin 570. A toe hold-down 578 is secured to the front end of the lever leg 574. An air actuated motor 582, pivoted to a bracket 584 secured to the frame 10, has a piston rod 586 that is pivoted to the rear end of the lever leg 576.

Referring to FIGURES 24 and 29, an air actuated motor 588 is fastened to a flange 590 secured to the rear of the slide plate 546. The piston rod 592 of the motor 588 is connected to a housing 594 that is slidably mounted in gibs 596 formed in the slide plate 546. A block 598 is slidably mounted in the gibs 596 forwardly of the housing 594 and is connected to the housing by a bolt 600 that is threaded into the block and extends rearwardly therefrom into the housing. A pair of symmetrically disposed wiper cams 608 are slidably supported on a thickened block 610 that forms the forward end of the slide plate 546. The block 610 has pins 612 upstanding therefrom that extend into slots or cams tracks 614 and 616 formed in the wiper cams 608. Forwardly diverging links 618 are pivotally connected at their rear ends to the block 598 and at their forward ends to the wiper cams 608. Wipers 620 are connected to and extend forwardly of the wiper cams 608. The wipers, as in conventional, are flat plates having forwardly divergent edges 622 that diverge from a vertex (FIGURE 29).

Referring to FIGURES 24, 24A and 29, the housing 594 has a laterally projecting limb 660 to which is pivoted a link 662. The link 662 is pivoted to one end of a bell crank 664, and the bell crank is pivoted intermediate its ends to a bracket 666 secured to the head 452. The other end of the bell crank is pivoted to the top of a rod 668, and the lower end of the rod 668 is pivoted to a sleeve 670. The sleeve 670 is secured to a shaft 672 that is rotatably mounted in a pair of hangers 674 secured to the frame 10. Five cams 676, 678, 680, 682 and 684, secured to the shaft 672, have cam lobes extending partly about their peripheries that are respectively positioned to engage valves 686, 688, 690, 692 and 694 in response to rotation of the shaft 672, the valves being mounted on a strap 695 secured to the hangers 674.

Figure 30:
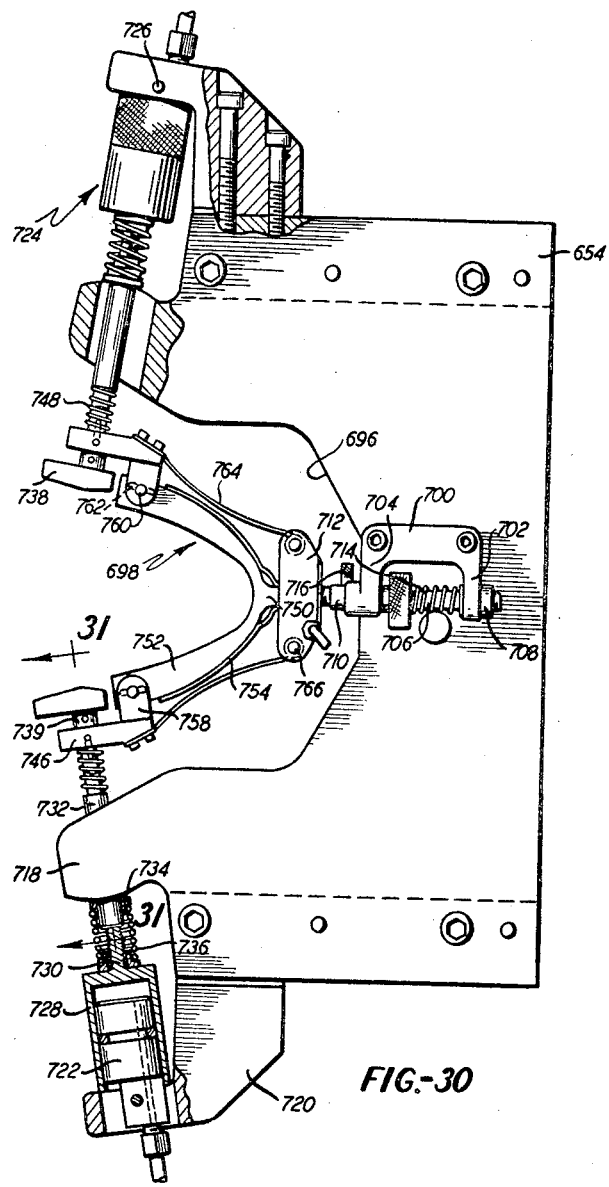
FIGURE 30 is a plan view of a shoe conforming yoke and bumpers.
Figure 31:
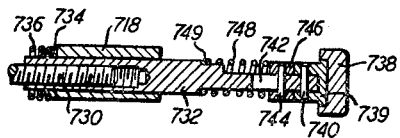
FIGURE 31 is a view taken on the line 31—31 of FIGURE 30.

A cover block 654 is secured to the block 610 and extends above the wiper cams 608 (FIGURES 1 and 2). Referring to FIGURES 30 and 31, the block 654 has a cut-out 696 at its forward end to accommodate a flexible shoe conforming pad or yoke 698. A U-shaped bracket 700, having a rear leg 702 and a front leg 704, is bolted to the block 654. A stud 706 extending through the legs has a stop nut 708 threaded thereon rearwardly of the leg 702. A sleeve, that is formed as a nut 710, is threaded on the stud 706 and is slidably guided in the front leg 704. The forward end of the stud 706 is threaded into and secured to a yoke mounting bracket 712. The rearward end of the nut 710 is formed into a cup that receives a compression spring 714 which is coiled about the stud 706 and extends between the nut 710 and the leg 702. A stop screw 716 is threaded into the block 654 under the stud 706 and rearwardly of the bracket 712. The block 654 is formed into inner flanges 718 at the forward ends of the cut-out 696 and outer flanges 720 that are bolted to the block. The piston 722 of an air actuated motor 724 is pivotally secured to each flange 720 by a pin 726 to extend inwardy thereof and a cylinder 728 is slidable on each piston 722. Each cylinder 728 has a screw 730 extending inwardly thereof that is threaded into a bar 732, the bars 732 being slidably mounted in the inner flanges 718. A sleeve 734 is slidably mounted on each bar 732 to bear against the exterior of an inner flange 718, and compression springs 736 interposed between the sleeves 734 and the cylinders 728 serve to yieldably urge the cylinders and the bars 732 outwardly with the cylinders abutting against the outer flanges 720. A rubber bumper 738 is mounted on a mount 739 that in turn is pivotally secured to the inner end of each bar 732 by a pin 740. Slots 742, formed on the bars 732 outwardly of the bumpers 738 and pins 740, receive pins 744 that are secured to brackets 746. Compression springs 748, interposed between shoulders 749 on the bars 732 and the brackets 746 serve to yieldably urge the brackets 746 inwardly with the pins 744 engaging the inner ends of the slots 742.

The yoke 698 is of substantially U-shape and has a bight 750 and a pair of legs 752 extending forwardly of the bight on opposite sides of the bight. The yoke is made of a flexible, deformable material such as Teflon and has a pair of bowed springs 754 extending exteriorly of each yoke leg from the bight forwardly thereof. The bight 750 of the yoke is received in a socket in the bracket 712. An inwardly extending support arm 758 on each bracket 746 has a downwardly extending pin 760 that is inserted into a slot 762 in each yoke leg 752. Each bracket 746 has a spring arm 764 secured thereto and extending rearwardly thereof that is entwined at its rear end on a pin 766 located in the mounting bracket 712. The yoke 698 is located in the machine directly above the wipers 620.

In the idle condition of the machine, the motor 16 and the insole rests 64, 70 carried thereby are in a lowered condition, the motor 88 is in the FIGURE 5 position so that the applicator 120 is in an upper position urged to a level slightly higher than the level of the insole rests 64, 70 by the springs 106, the front pincers 286 are open with the jaw 282 in its uppermost position due to the projection of the piston rod 276 upwardly of the motor 272 and the retraction of the piston rods 292 into the motors 290, pressurized air is entering the cylinder 304 through a line 836 (FIGURE 6) to raise the piston rod 308 and the front retarder 320 with respect to the housing 254 against the resistance of the spring 314, the side retarders 344 are held in a raised position by the motors 336 under relatively low pressure, the motors 406 are held in an outward position against the cams 414 by the springs 418 and are held by gravity in a forward position with the set screws 410 bearing against the stop plates 378 due to the inclination from the vertical of the motors 406 (FIGURE 1), the piston rods 424 of the motors 406 are in elevated position and the motors 426 are in a lowered position with respect to the piston rods 424 so that the side pincers 432 are in a raised position with their jaws open, the piston rod 458 is projected forwardly of the motor 454 so that the heel clamp 486 is in a forward position, the piston rod 518 is projected outwardly of the cylinder 514 of the motor 516 so that the brakes 494 are in an unlocking position with respect to the bars 462, the piston rod 522 is projected outwardly of the motor 520 so that the slide plate 546 and the parts carried thereby are in a rearward out-of-the-way position, the piston rod 586 is retracted into the motor 582 so that the hold-down 578 is in an elevated position, the piston rod 592 is retracted into the motor 588 so that the wipers 620 are in a rearward open position, the spring 714 yieldably urges the bight 750 of the yoke 698 forwardly with the nut 708 bearing against the rear leg 702, the yoke legs 752 are yieldably urged inwardly with respect to the bars 732 under the influence of the springs 748, and the cylinders 728 of the motors 724 bear against the outer flanges 720 with no pressurized air entering the motors 724 thus maintaining the bumpers 738 outward of the inner peripheral wall of the yoke 698.

Before starting the machine, crystals of thermoplastic cement are placed in the compartment 230 of the cement pot 168 wherein they melt and flow through the cut-outs 234 into the compartment 232, through the compartments 232 and the passages 211, 212 and 214 into the bore between the plunger 206 and the adapter 220 and into the passage 222 up to the ball valve 224 (FIGURE 9). The handle 194 is then manually oscillated to move the plunger 206 back and ofrth from FIGURE 9 position to a forward position determined by the setting of the stud 190 which causes the molten cement to be forced through conduit means that comprise the passage 222, the conduit 144, the passage 141 (FIGURE 5), the holes 134 and 136, the channels 130 (FIGURE 7) and the holes 128 (FIGURE 6) until the molten cement appears at the tops of the holes 128. After this, in the idle condition of the machine, the motor 186 is in such condition that the plunger 206 is in its rearward position.

Referring to FIGURES 33, 33A and 33B, a shoe assembly is presented bottom-down to the machine to be pulled over and toe lasted. The shoe assembly comprises a shoe insole 838 located on the bottom of a last 839 preferably by being tacked thereto, and a shoe upper 840 draped over the last. The insole is brought to bear against the top of the applicator 120, which at this time is resiliently urged above the level of the insole rests 64, 70 by the springs 106, so that the applicator bears against and supports the margin of the toe portion of the insole. The outer periphery of the last is caused to bear against the front retarder 320 and the side retarders 344 so that the retarders act as gauges to accurately locate the shoe assembly in the machine. The toe end of the upper margin is placed between the open jaws of the front pincers 286 and the forepart portions of the upper margin are inserted between the open jaws of the side pincers 432.

Figure 32:
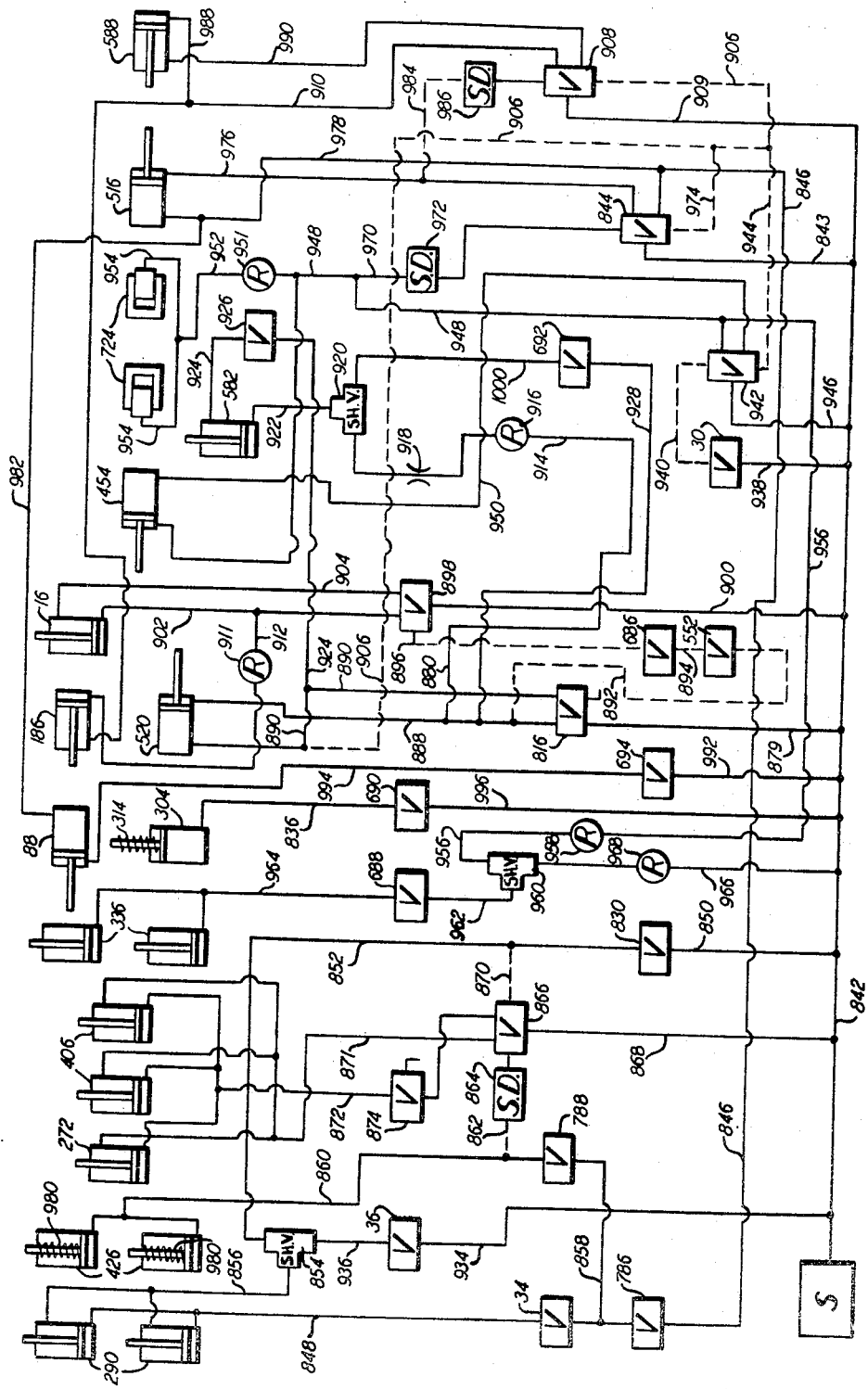
FIGURE 32 is a schematic diagram of the control circuit of the machine.

The control system for the machine is shown in the schematic circuit diagram of FIGURE 32. The control system includes shuttle valves that are conventional items that have two inlet ports and one exit port. The shuttle valves are so constructed that air of different pressures may enter the two inlet ports and the air emanating from the exit port will have the pressure of the higher of the two presures entering the inlet ports. The control system also includes sequencing devices that are conventional items so constructed as to offer resistance to the passage of air therethrough so that the air will follow an alternative path other than through the sequencing device if one is available. When such an alternative path is not available or is blocked, the air will go through the sequencing device.

The operator now depresses a platform 774 (FIGURE 1) an amount sufficient shift a valve 786 to open it and to close a valve 830. Referring to the schematic circuit diagram of FIGURE 32, wherein the source of air for the pneumatic system is designated as S, the pressure lines are drawn in solid lines and the pilot lines are drawn in dotted lines, the opening of the valve 786 causes pressurized air to pass from the source through a line 842, a line 843, a valve 844, a line 846, the valve 786, a normally open valve 34 and a line 848 to the motors 290 to actuate these motors to close the jaws of the pincers 286 on the toe end portion of the upper margin. In the idle condition of the machine, air had entered the motors 290 to maintain the pincers 286 open from the line 842, a line 850, the valve 830, a line 852, a shuttle valve 854 and a line 856. During the actuation of the motors 290 to close the jaws of the pincers 286, the air above the pistons of these motors egresses therefrom through the line 856, shuttle valve 854, line 852 and the valve 830 and is exhausted to atmosphere from the valve 830.

The opening of the valve 786 also causes pressurized air to pass through this valve and a line 858 to a now closed valve 788.

The operator now depresses the platform 774 further to shift the valve 788 to open it while the valve 786 remains shifted. This causes pressurized air to pass from the line 858, through the valve 788 and a line 860 to the motors 426 to actuate these motors to raise the cones 448 to first lower the jaws 436 and then raise the jaws 438 and thereby cause the side pincers 432 to grip the forepart portions of the upper margin. At the same time pressurized air passes from the line 860 and a pilot line 862 to a sequencing device 864 to shift a valve 866 after the actuation of the motors 426. The valve 866 had been maintained in its initial position by pressurized air passing from the valve 830 through a pilot line 870 to the valve 866. The closure of the valve 830 had allowed the air in the line 870 to be exhausted to atmosphere through this valve. The shifting of the valve 866 enables pressurized air to pass from the line 842 through a line 868, the valve 866 and a line 871 to the motors 272 and 406 to actuate these motors. Prior to the shifting of the valve 866, pressurized air had passed to the motors 272 and 406 form the valve 866 and a line 872 to maintain these motors in their idle condition. The air egressing from the motors 272 and 406 in response to the shifting of the valve 866 is vented to atmosphere through the line 872 and a quick exhaust valve 874. The actuation of the motor 272 causes the front pincers 286 to move downwardly and rearwardly away from the last to thereby stretch the toe portion of the upper margin about the toe end of the last and the actuation of the motors 406 causes these motors to move the side pincers 432 downwardly to stretch the forepart portions of the upper margin about the last in the manner described in the aforementioned parent application Ser. No. 472,525 filed July 16, 1965. The machine now comes to a stop with the shoe assembly engaging parts in the position shown in FIGURES 34 and 34A. The portions of the stretched upper margin between the front and side pincers are outspread into dog ears 878 (FIGURE 34A).

As stated above, when the shoe assembly was placed in the machine, the applicator 120 was resiliently urged above the level of the insole rests 64, 70 by the springs 106, this causing the insole 838 to be located above the insole rests. The downward pulling action of the pincers 286 and 432 causes the applicator to move downwardly against the forces of the springs 106 until the insole 838 comes into engagement with the insole rests. Due to the fact that the applicator is connected by the pin and slot connections 114 to the three prongs 102, 104 the applicator is capable of having limited universal tilting movement with respect to a horizontal plane during its downward movement, so that at the end of its downward movement it will conform to and bear snugly against the insole regardless of the fact that the insole bottom does not lie in a true horizontal plane. At the end of the downward movement of the applicator, the insole is therefore supported at its margin by the applicator 120, which prevents the insole margin from drooping downwardly of the last, and is supported interiorly of its margin by the insole rests 64, 70.

The operator may now further depress the platform 774 to open a valve 816 while the valves 786 and 788 remain shifted. The shifting of the valve 816 enables pressurized air to pass from the line 842 through a line 879, the valve 816 and a line 888 to the motor 520 to actuate this motor to cause the piston rod 522, through the above described linkage shown in FIGURES 26-28, to move the slide plate 546 from its rearward out-of-the-way position to a forward working position. Prior to the shifting of the valve 816 the motor 520 had kept the slide plate 546 in its idle out-of-the-way position by pressurized air passing from the line 879, through the valve 816 and a line 890 to the motor 520, and upon actuation of this motor, the air in it is exhausted to atmosphere through the line 890 and the valve 816. The pressurized air entering the line 888 in response to the shifting of the valve 816 had also passed through a pilot line 892 to the normally closed valve 552. Toward the end of the forward movement of the slide plate 546, the cam 550 opens the valve 552 to direct the pressurized air through the valve 552, a pilot line 894, the normally open valve 686 and a pilot line 896 to shift a valve 898. The shifting of the valve 898 causes pressurized air to pass from the line 842 through a line 900, the valve 898 and a line 902 to the motor 16 to actuate this motor to raise the post 20 and the parts carried thereby until tangs 252 mounted to and extending outwardly of the post extension 44 engage lugs 250 mounted to the base plate 12 (FIGURES 2 and 4). Prior to shifting of the valve 898, the motor 16 had been maintained in its idle position by pressurized air passing from the valve 898 through a line 904 to the motor 16.

Prior to the shifting of the valve 816, there had been no pressurized air in the motor 186 so that the aforementioned manipulation of the handle 194 could take place when the machine was in its idle condition due to the pressurized air in the line 890 passing through a pilot line 906 to a valve 908 to maintain this valve in a position wherein pressurized air could not pass from this valve through a line 910 to the motor 186. The shifting of the valve 816 cut off the flow of pressurized air into the line 906, thus enabling the valve 908 to be shifted later in the machine cycle to enable pressurized air to flow from the valve 908 to the motor 186 as described below. Upon shifting of the valve 816, the pressurized air in the line 906 is exhausted to atmosphere through the line 890 and the valve 816. The shifting of the valve 898 also causes pressurized air under relatively low pressure from the line 902 to pass through a self relieving low pressure regulator 911 and a line 912 to the motor 186 to actuate this motor to move the plunger 206 forwardly an amount determined by the position of the stud 190 with respect to the block 180 and thereby extrude a predetermined amount of molten cement through the holes 128 and groove 126 of the applicator 120 against the bottom of the margin of the insole 838 that is equal to the volume of cement displaced by the plunger 206 during its forward movement. The pressures generated during the forward movement of the plunger 206 unseats the valve 224 to allow the cement to pass from the bore 208, through the adapter 220, to the applicator 120 and also forces the ball 216 upwardly from the pin 218 against the ferrule 210 to block the passage 212 and thus cut off the flow of molten cement from the compartment 232 into the bore 208. The subsequent rearward movement of the plunger 206 described below, enables the valve 224 to be reseated and the passage 214 to reopen.

The shifting of the valve 816 also causes pressurized air to pass from the valve 816, through a line 880, a line 914, a low pressure regulator 916, a flow control valve 918, a shuttle valve 920 and a line 922 to the motor 582 to actuate this motor under relatively low pressure to thereby force the hold-down 578 against the top of the forepart of the rising shoe under relatively low pressure. Prior to the shifting of the valve 816, the motor 582 had been maintained in its idle condition by pressurized air passing from the valve 816 through a line 924 to this motor. Upon actuation of the motor 582, the pressurized air that had passed into it from the line 924 is exhausted to atmosphere through the line 924 and a quick exhaust valve 926.

The shifting of the valve 816 also causes pressurized air to flow from the valve 816 through a line 928 to the now closed valve 692.

To recapitulate, upon shifting of the valve 816, the slide plate 546 is brought from its out-of-the-way position to its forward working position. The forward movement of the slide plate 546 brings the wipers 620 and the yoke 698 and bumpers 738 to a position where they can act on the shoe assembly as indicated in phantom in FIGURE 34. When the slide plate 546 has completed its forward movement, the post 20 is caused to rise to raise the applicator 120, the insole rests 64, 70, the pincers 286 and 432 and the retarders 320 and 344 until the tangs 252 engage the lugs 250, the elevation of the lugs 250 being such that the shoe assembly terminates its rise when the insole bottom is above the level of the tops of the wipers 620 an amount that is approximately equal to the thickness of the margin of the upper 840. At about the beginning of the rise of the applicator 120, a predetermined quantity of cement is extruded from the applicator 120 onto the margin of the insole 838 to coat the insole with the ribbon of cement 930 indicated in FIGURE 35. Shortly after the shoe assembly has started its rise, the hold-down 578 comes into engagement with the top of the forepart of the shoe assembly under relatively light pressure as indicated in phantom in FIGURE 34 and rides upwardly with the shoe assembly under this relatively light pressure during the rise of the shoe assembly.

The shoe assembly was initially so placed on the applicator 120 that when the yoke 698 was moved to its forward working position the edges of the last 839 overlapped the inner wall 932 of the yoke 698 as indicated in FIGURE 36. When the shoe assembly is forced upwardly by the motor 16, the yoke wall 932 is initially compressed. When the wall can no longer be compressed, the bight 750 of the yoke flexes rearwardly against the pressure exerted by the spring 714 and the yoke legs 752 flex outwardly against the pressures exerted by the springs 754. After this, the support arms 758 and the spring arms 764 swing outwardly about the pins 766 and move the pins 744 outwardly in the slots 742 against the yieldable forces exerted by the springs 748 with the brackets 746 moving away from the mounts 739. The yieldable pressures exerted by the springs 714, 748, and 754 and the spring arms 764 cause the yoke 698 to snugly engage the upper 840 and cause the upper to snugly conform to the shape of the last 839 during the rise of the shoe assembly.

The parts are so constructed that the raising of the side retarder blades 344 during the rise of the post 20 causes the side retarders to press the dog ears 878 against the bottoms of the wipers 620 with the relatively light resilient force afforded by the motors 336, and the raising of the front retarder blade 320 during the rise of the post 20 causes the front retarder to press the portion of the upper stretched by the front pincers 286 against the bottoms of the wipers 620 immediately to the rear of the vertex 624 of the wipers under the force exerted by the pressurized air in the cylinder 304.

At or near the end of the rise of the toe post 20 and at or near the time that the front retarder 320 has forced the upper margin against the wiper bottoms, a cam 40 closes the valve 34 and a cam 42 opens a valve 36 (FIGURE 3). The closing of the valve 34 shuts off the flow of pressurized air passing through this valve and the line 848 to the motors 290 enabling this air to exhaust from these motors and the line 848 to atmosphere through the valve 34. The opening of the valve 36 enables pressurized air to pass from the line 842, through a line 934, the valve 36, a line 936, the shuttle valve 854 and the line 856 to the motors 290. As a result, in response to the closing of the valve 34 and the opening of the valve 36, the motors 290 are actuated to open the front pincers 286 to release the toe end portion of the upper margin and the pincers 286 can now be moved downwardly and rearwardly to its lowermost position by the motor 272.

At or near the end of the rise of the toe post 20, a cam 32 opens a normally closed valve 30 (FIGURE 3) which enables pressurized air to pass from the line 842 through a line 938, the valve 30 and a pilot line 940 to the top of a valve 942 as seen in FIGURE 32 to open the valve 942. The valve 942 had initially been maintained in a closed position by pressurized air passing from the line 906, through a line 944, to this valve. As described above, the shifting of the valve 816 had enabled the pressurized air in the line 906 to be exhausted to atmosphere which enables the valve 942 to shift in response to pressurized air entering it through the line 940.

The shifting of the valve 942 enables pressurized air to pass from the line 842 through a line 946, the valve 942 and a line 948 to the motor 454 to actuate this motor to move the bars 462 rearwardly and thereby bring the heel clamp 486 to bear against the heel of the shoe assembly. Prior to the shifting of the valve 942, pressurized air had flowed from the line 946 through the valve 942 and a line 950 to the motor 454 to maintain this motor in its idle condition.

The shifting of the valve 942 also causes pressurized air to pass through this valve, the line 948, a regulator 951, a line 952 and lines 954 to the motors 724 to move the cylinders 728 inwardly of the pistons 722 against the pressures of the springs 736 and 748 to thereby force the inner wall 932 of the yoke 698 against the toe and forepart of the shoe assembly under higher pressure than had heretofore been exerted by the springs 748 and to force the bumpers 738 inwardly against the foreparts of the upper in regions that are rearward of the yoke 698. The bumpers, in engaging the upper, can swing about the pins 740 to accommodate themselves to the curvature of the last.

The shifting of the valve 942 also causes pressurized air to pass through this valve, a line 956, a high pressure regulator 958, a shuttle valve 960, a line 962, the normally open valve 688, and a line 964 to the motors 336 to cause these motors to force the side retarders 344 upwardly under relatively high pressure and thereby press the dog ears 878 of the upper 840 against the bottoms of the wipers 620 under relatively high pressure. Up to this time, the side retarders had been forced upwardly under relatively low pressure by pressurized air passing from the line 842 through a line 966, a low pressure regulator 968, the shuttle valve 960, the line 962, the valve 688 and the line 964 to the motors 366.

After the aforementioned operations have taken place in response to the shifting of the valve 942, pressurized air passes from the line 948 through a line 970 and a sequencing device 972 to the top of valve 844 as seen in FIGURE 32 to shift this valve. The valve 844 had been maintained in its original position by pressurized air passing from the line 906 into the bottom of the valve by way of a line 974. This air in the valve 844 had been bled to atmosphere through the lines 974, 906 and 890 and the valve 816 when the valve 816 was shifted, but this bleeding did not effect any shifting of the valve 844.

The shifting of the valve 844 causes pressurized air to pass from the line 843 through the valve 844 and a line 976 to the motor 516 to actuate this motor to retract the piston rod 518 into the cylinder 514 and thus apply the brakes 494 against the bars 462 to lock the heel clamp 486 in position. Prior to the shifting of the valve 844, pressurized air had passed from the valve 844 through a line 978 to the motor 516 to maintain this motor in its idle condition with the brakes 494 open.

The shifting of the valve 844 also cuts off the flow of pressurized air to the motors 426 from the valve 844 through the line 846, the valve 786, the line 858, the valve 788 and the line 860 so that the air in these motors can now bleed through these lines and valves back to the valve 844 and there be exhausted to atmosphere. This enables the springs 980 (FIGURES 23 and 32) of the motors 426 to lower the piston rods 450 so that the jaws of the side pincers 432 may open under the influence of the elastic bands 442 and thus release the forepart portions of the upper margin that had been gripped by the pincers 432. After the pincers 432 release the upper margin they are lowered by further downward movement of the piston rods 424 of the motors 406.

Prior to the shifting of the valve 844 pressurized air had entered the motor 88 to maintain the applicator 120 in its upper position by pressurized air passing through the valve 844, the line 978 and a line 982 to the motor 88. The shifting of the valve 844 causes the air in the motor 88 to be exhausted through the lines 982 and 978 and the valve 844. This does not result in the lowering of the applicator 120 at this time due to the toggle links 94, 96 tending to remain in the position shown in FIGURE 5.

After the completion of the above mentioned operations in response to the shifting of the valve 844, the shifting of the valve 844 enables pressurized air to pass from this valve through the line 976, a pilot line 984 and a sequencing device 986 to shift the valve 908 to provide the results set forth below. At this time the parts assume the position shown in FIGURES 37, 37A and 37B.

The aforementioned shifting of the valve 908 by pressurized air flowing through the pilot line 984 and sequencing device 986 enables pressurized air to flow from the line 842 through a line 909, the valve 908 and the line 910 to the motor 186 at full line pressure to overcome the low pressure air entering this motor through the line 912 and thereby actuate this motor to return the plunger 206 to its idle position. The low pressure air in the motor 186 is now exhausted to atmosphere through the line 912 and the self-relieving regulator 911.

The shifting of the valve 908 enables pressurized air to pass from this valve through the line 910 and a line 988 to the motor 588 to actuate this motor to move the wipers 620 in a wiping stroke. Prior to the shifting of the valve 908, pressurized air had entered the motor 588 through the valve 908 and a line 990 to maintain the wipers in their retracted position.

The aforesaid actuation of the motor 588, through the housing 594, block 598 and links 618 causes the wiper cams 608 and the wipers 620 carried thereby to move in their wiping stroke with respect to the block 610 with the pins 612 riding in the cam tracks 614 and 616 in a path determined by the configuration of the cam tracks to cause the wipers to engage the upper margin while the upper is stretched tightly about the last to wipe or fold the upper margin against the insole 838 and to bond the upper margin to the insole by means of the ribbon of cement 930 on the insole.

As the wipers perform their wiping stroke, the connection between the limb 660 and the shaft 672 (FIGURES 24 and 29) causes the shaft 672 to rotate and cause the cams 676, 678, 680, 682 and 684 to respectively actuate the valves 686, 688, 690, 692 and 694.

First the normally closed valve 694 is opened to enable pressurized air to pass from the line 842 through a line 992, the valve 694 and a line 994 to the motor 88 to actuate this motor to lower the applicator 120 out of the path of the wipers.

After the actuation of the valve 694, the normally open valves 688 and 690 are closed. The closing of the valve 688 shuts off the flow of pressurized air to the motor 336 so as to terminate the application of pressure by the side retarders 344 of the upper margin against the wiper bottoms. The closing of the valve 690 cuts off the flow of pressurized air that had heretofore flowed to the cylinder 304 from the line 842 through a line 996, the valve 690 and the heretofore mentioned line 836 so that the spring 314 can lower the front retarder 320 away from the wiper bottoms with the pressurized air in the cylinder 304 venting to atmosphere through the line 836 and the valve 690.

After the closing of the valves 688 and 690, the normally open valve 686 is closed to shut off the flow of pressurized air passing from the valve 686 through the pilot line 896 to the valve 898. This enables a conventional return spring in the valve 898 to shift this valve so as to cause pressurized air to pass from the line 900 through the valve 898 and the line 904 to the motor 16 to actuate this motor to lower the insole rests 64, 70 out of the path of the wipers.

After the closing of the valve 686, the normally closed valve 692 is opened. This enables air under full line pressure to pass from the line 928 through the valve 692, a line 1000, the shuttle valve 920 and the line 922 to the motor 582 to actuate this motor to force the holddown 578 downwardly against the forepart of the shoe assembly under greater pressure than had heretofore been provided by the pressurized air entering the shuttle valve 920 through the line 914. After a predetermined time interval, the valves 786, 788, 816 and 830 are caused to return to their original positions so that all of the machine parts return to their idle conditions and the machine cycle is completed. The return of the valve 816 to its original condition causes pressurized air to pass through the valve 816, the line 890 and the pilot line 906 to shift the valve 908 to its idle condition whereby pressurized air passes through the valve 908 and the line 990 to the motor 588 to cause this motor to retract the wipers and the air that had previously entered the motor 588 through the line 988 is exhausted to atmosphere through the line 988, the line 910 and the valve 908. In addition, the shifting of the valve 908 enables the air in the motor 186 to be vented to atmosphere through the line 910 and the valve 908 so that in the idle condition of the machine there is no pressurized air entering the motor 186 and the handle 194 may be manipulated to manually reciprocate the plunger 206 without having to overcome the force of pressurized air in the motor 186.

The upper surface of the extruding-support section 124 is inclined inwardly as indicated in FIGURE 5 to enable it to conform to the insole bottom, and due to the machine being inclined as aforesaid, the applicator is inclined downwardly from right to left as seen in FIGURE 5. Therefore, any surplusage of molten cement that is applied to the insole during each machine cycle will gravitationally flow inwardly of the upper surface of the section 124, down its interior side walls and onto the upper surface of the base section 122 and from the base section into the gutters 154 and 156 and then onto the deflector plate 152.

Since the sections 124 and 120 are heated by the heating element 148 and the deflector arrangement 151 is not, the molten cement will not solidify until it strikes the relatively cool deflector arrangement and will accumulate thereon. The upper surface of the deflector arrangement is preferably coated with a material from which the solid accumulation of cement may be readily peeled such as Teflon.

We claim:
1. In a machine for operating on a workpiece, a mechanism for extruding cement onto the workpiece during an operating cycle of the machine comprising: an applicator; at least one hole in the applicator through which the cement may be extruded; a bore; a plunger mounted for forward and rearward movement in the bore; conduit means interconnecting the forward end of the bore and the hole; a fluid pressure actuated motor having a drive member that is reciprocable between a first position and a second position in response to the admission of fluid under pressure to the motor; connections between the drive member and the plunger so constructed as to enable movement of the drive member from the first position to the second position to cause forward movement of the plunger in the bore and movement of the drive member from the second position to the first position to cause rearward movement of the plunger in the bore; a control system for controlling the admission of the fluid to the motor so constructed as to block fluid from the motor when the machine is in its idle condition whereby the drive member may be manually manipulated to cause the plunger to be reciprocated to force cement from the bore through the conduit means into the hole in response to repeated forward movements of the plunger to thereby fill the conduit means and the hole with cement; and means in the control system actuable to admit fluid to said motor during the machine cycle so as to move the drive member from the first position to the second position to thereby cause a volume of cement to be extruded from the applicator that corresponds to the volume of cement displaced from the bore into the conduit means by the forward movement of the plunger in the bore.

2. In a machine for operating on a workpiece, a mechanism for extruding cement onto the workpiece during an operating cycle of the machine comprising: an applicator; at least one hole in the applicator through which the cement may be extruded; a bore; a plunger mounted for forward and rearward movement in the bore; conduit means interconnecting the forward end of the bore and the hole; a block mounted for movement between a first position and a second position; a fluid pressure actuated motor having a movable drive member connected to the block so that the block may move between said positions in response to the admission of fluid under pressure to the motor; connections between the block and the plunger so constructed as to enable movement of the block from the first position to the second position to cause forward movement of the plunger in the bore and movement of the block from the second position to the first position to cause rearward movement of the plunger in the bore; a manually manipulable handle secured to the block; a control system for controlling the admission of the fluid to the motor so constructed as to block fluid from the motor when the machine is in its idle condition whereby manual manipulation of the handle causes the plunger to be reciprocated to force cement from the bore through the conduit means into the hole in response to repeated forward movements of the plunger to thereby fill the conduit means and the hole with cement; and means in the control system actuable to admit fluid to said motor during the machine cycle so as to move the block from the first position to the second position to thereby cause a volume of cement to be extruded from the applicator that corresponds to the volume of cement displaced from the bore into the conduit means by the forward movement of the plunger in the bore.

3. The mechanism as defined in claim 2 further comprising: a stop positioned in alignment with the block that is determinative of the second position of the block; and means for adjusting the position of the stop to thereby adjust the second position of the block and accordingly adjust the volume of cement extruded from the applicator in response to actuation of the motor to move the block from the first position to the second position.

References Cited

UNITED STATES PATENTS

| 994,305 | 6/1911 | Eppler | 103—207 |
| 1,367,217 | 2/1921 | Tyden | 103—207 |
| 3,251,081 | 5/1966 | Springer | 118—410 X |

WALTER A. SCHEEL, Primary Examiner

J. P. McINTOSH, Assistant Examiner

U.S. Cl. X.R.

118—410